(12) United States Patent
Wada

(10) Patent No.: US 9,830,842 B2
(45) Date of Patent: Nov. 28, 2017

(54) DISPLAY APPARATUS FOR PERFORMING CONTROL TO CHANGE A POSITION ON AN IMAGE WHERE AN ADDITIONAL IMAGE IS SUPERIMPOSED

(71) Applicant: CANON KABUSHIKI KAISHA, Tokyo (JP)

(72) Inventor: Hidetoshi Wada, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 66 days.

(21) Appl. No.: 14/660,168

(22) Filed: Mar. 17, 2015

(65) Prior Publication Data

US 2015/0269913 A1    Sep. 24, 2015

(30) Foreign Application Priority Data

Mar. 19, 2014  (JP) ................. 2014-056226

(51) Int. Cl.
*G09G 3/00* (2006.01)
*G06F 3/0482* (2013.01)

(52) U.S. Cl.
CPC .......... *G09G 3/002* (2013.01); *G06F 3/0482* (2013.01); *G09G 2310/0232* (2013.01); *G09G 2340/0464* (2013.01); *G09G 2340/12* (2013.01); *G09G 2354/00* (2013.01)

(58) Field of Classification Search
CPC ................................................. H04N 9/3147
See application file for complete search history.

(56) References Cited

U.S. PATENT DOCUMENTS

| 2002/0021259 | A1* | 2/2002 | Itaki ....................... | G06F 3/1438 345/1.1 |
| 2002/0159035 | A1* | 10/2002 | Koyama ............ | H04N 5/44513 353/31 |
| 2005/0117121 | A1* | 6/2005 | Meerleer .................. | G06F 3/14 353/30 |
| 2009/0135200 | A1* | 5/2009 | Schultz .................... | G09G 5/14 345/629 |
| 2010/0182234 | A1* | 7/2010 | Takahashi .............. | G03B 21/14 345/157 |
| 2013/0258289 | A1* | 10/2013 | Aruga .................... | G03B 21/26 353/30 |

FOREIGN PATENT DOCUMENTS

CN    102122110 A    7/2011
CN    102282842 A    12/2011
(Continued)

*Primary Examiner* — Jeffery A Brier
(74) *Attorney, Agent, or Firm* — Canon U.S.A., Inc. IP Division

(57) ABSTRACT

A display apparatus includes a display unit that displays a first image on a screen, wherein the first image includes a first area and a second area, wherein the first area is an area in which an image displayed by another display apparatus is superimposed, and wherein the second area is an area in which a second image is displayed, and a control unit that controls a position of the second area so that at least a part of the second area and at least a part of the first area are not superimposed on each other if a request for changing a position of the second area so that at least a part of the second area and at least a part of the first area are superimposed is input.

10 Claims, 3 Drawing Sheets

(56) References Cited

FOREIGN PATENT DOCUMENTS

| | | | |
|---|---|---|---|
| CN | 103037185 A | | 4/2013 |
| CN | 103152537 A | | 6/2013 |
| JP | 2005-122393 A | | 5/2005 |
| JP | 2005122393 A | * | 5/2005 |
| JP | 2012019442 A | * | 1/2012 |

* cited by examiner

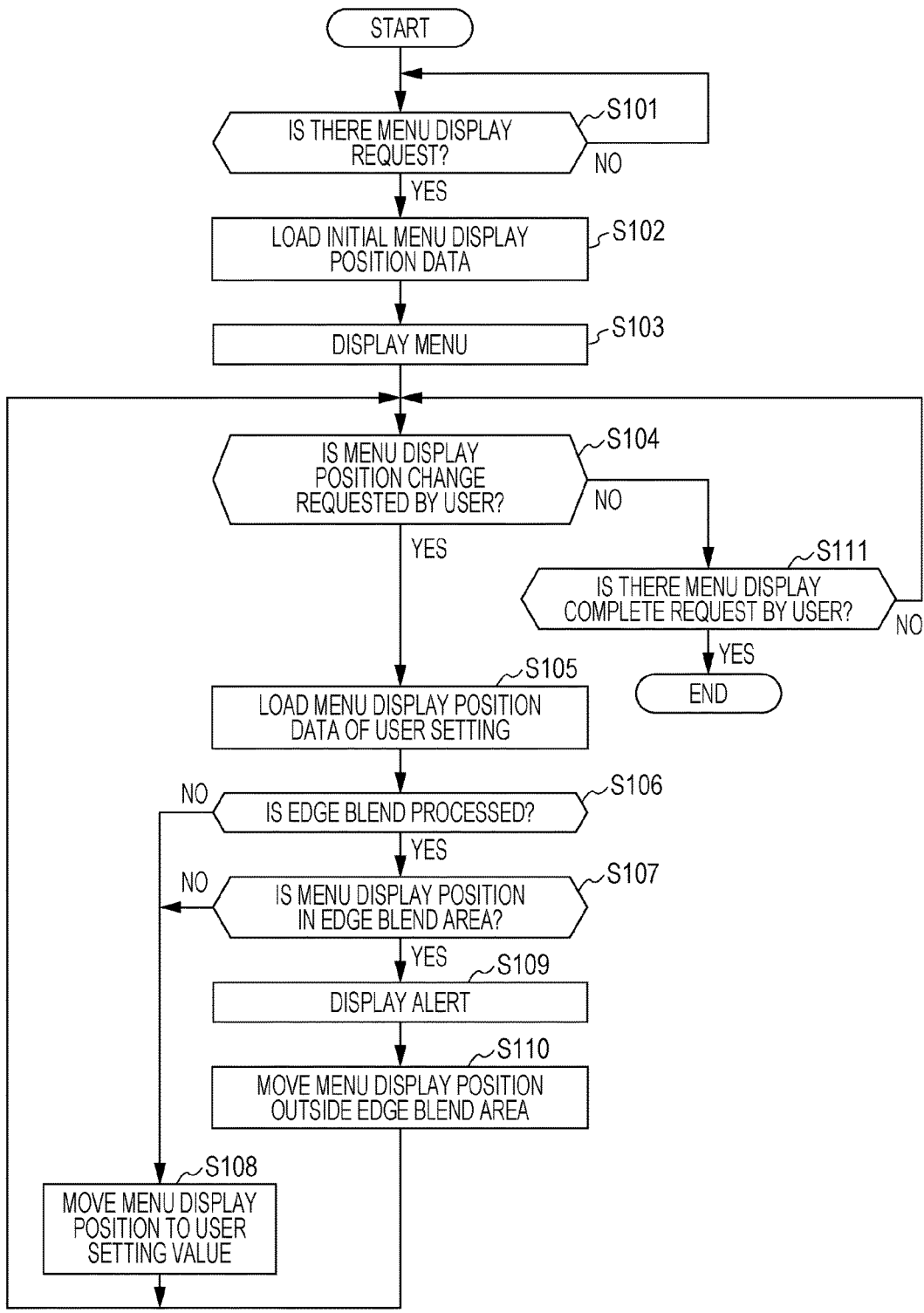

DISPLAY APPARATUS FOR PERFORMING CONTROL TO CHANGE A POSITION ON AN IMAGE WHERE AN ADDITIONAL IMAGE IS SUPERIMPOSED

BACKGROUND

Field of the Invention

Aspects of the present invention generally relate to, for example, a display apparatus that displays an image on a screen.

Description of the Related Art

Displaying, on a display, a menu image for changing an image configuration displayed on a display has been proposed.

Japanese Patent Laid-Open No. 2005-122393 discloses changing a position of a menu image displayed on a display by causing a user to operate an indicator.

In a recent system including a plurality of projection apparatuses, a multi-projection technique has been proposed in which one image is divided into a plurality of images, each of the divided images is projected on a screen from each of the projection apparatuses, and a plurality of images projected by each of the projection apparatuses are superimposed on one another to project one image on a screen.

In such a system, a method for displaying a menu image has not been considered. Therefore, the menu image is sometimes difficult to be seen due to images projected by other projection apparatuses.

SUMMARY

Aspects of the present invention are generally related to preventing an additional image from being displayed in an area superimposed on an image projected by another projection apparatus.

According to aspect of the present invention, a display apparatus includes a display unit configured to display a first image on a screen, wherein the first image includes a first area and a second area, wherein the first area is an area in which an image displayed by another display apparatus is superimposed, and wherein the second area is an area in which a second image is displayed, and a control unit configured to control a position of the second area so that at least a part of the second area and at least a part of the first area are not superimposed on each other if a request for changing a position of the second area so that at least a part of the second area and at least a part of the first area are superimposed is input.

Further aspects of the present disclosure will become apparent from the following description of exemplary embodiments with reference to the attached drawings.

BRIEF DESCRIPTION OF THE DRAWINGS

FIG. 2 is a flowchart illustrating an example of a display control process executed in the first embodiment.

DESCRIPTION OF THE EMBODIMENTS

Various exemplary embodiments will be described in detail below with reference to the drawings.

First Embodiment

Figure 1:
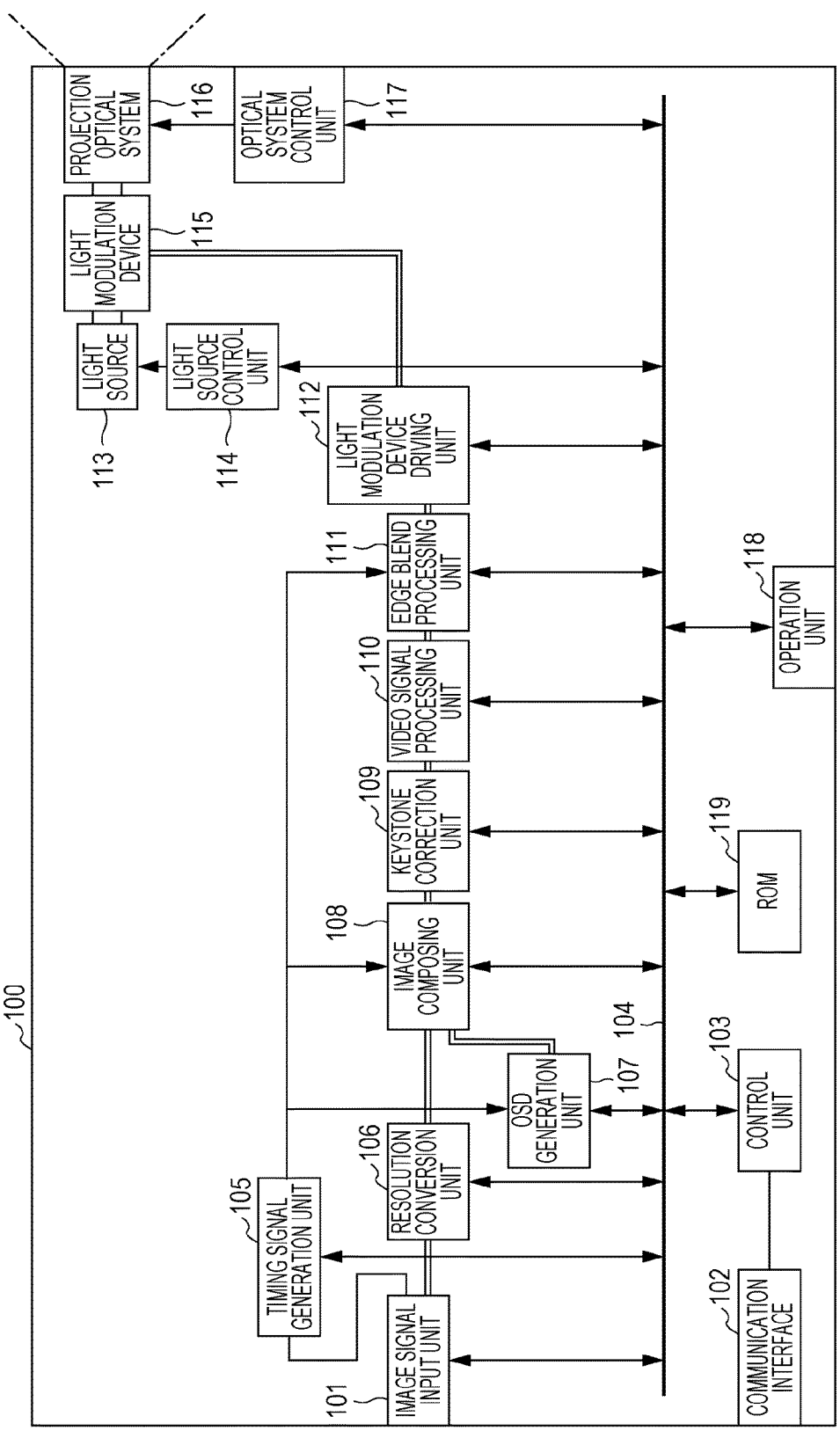
FIG. 1 is a block diagram illustrating an example of a configuration of a projection apparatus according to a first embodiment.

FIG. 1 is a block diagram illustrating an example of a configuration of a projection apparatus 100 in a first embodiment. The projection apparatus 100 is, for example, a projector.

The projection apparatus 100 may project an image, generated by superimposing an image projected by the projection apparatus 100 and an image projected by another projection apparatus, on an unillustrated screen. Such projection is referred to as multi-projection.

As illustrated in FIG. 1, the projection apparatus 100 has an image signal input unit 101, a communication interface 102, a control unit 103, a communication bus 104, a timing signal generation unit 105, a resolution conversion unit 106, an OSD generation unit 107, an image composing unit 108, and a keystone correction (trapezoidal correction) unit 109. An image signal processing unit 110, an edge blend processing unit 111, a light modulation device driving unit 112, a light source control unit 114, an optical system control unit 117, an operation unit 118, and ROM 119 are connected to the communication bus 104.

The image signal input unit 101 obtains an image signal divided from one image by another projection apparatus or an external personal computer. Another projection apparatus or an external personal computer is herein referred to as an external apparatus. The image signal input from the external apparatus to the image signal input unit 101 may be a still image or a moving image.

The communication interface 102 is an interface for the communication with the external apparatus.

The control unit 103 controls the projection apparatus 100.

The communication bus 104 connects the control unit 103 to the image signal input unit 101, the timing signal generation unit 105, the resolution conversion unit 106, the OSD generation unit 107, the image composing unit 108, the keystone correction unit 109, and the image signal processing unit 110. The communication bus 104 connects the control unit 103 to the edge blend processing unit 111, the light modulation device driving unit 112, the light source control unit 114, the optical system control unit 117, the operation unit 118, and the ROM 119.

The timing signal generation unit 105 generates a timing signal for driving each block from a horizontal/vertical synchronization signal or a clock signal supplied from the image signal input unit 101. The resolution conversion unit 106 converts resolution of an image signal supplied from image signal input unit 101 into resolution of the light modulation device 115.

The OSD generation unit 107 generates, for example, a menu image for adjusting an image projected on an unillustrated screen by the projection apparatus 100 and a menu image for controlling the projection apparatus 100. The image composing unit 108 composes the image signal supplied from the resolution conversion unit 106 and the menu image generated by the OSD generation unit 107. The menu image generated by the OSD generation unit 107 is an additional image with respect to the image signal supplied from the image signal input unit 101.

The keystone correction unit 109 corrects trapezoidal distortion occurred in the image projected by the projection apparatus 100 when the projection apparatus 100 is not arranged to face the unillustrated screen. The image signal processing unit 110 performs noise reduction and color adjustment. The edge blend processing unit 111 discriminates a superimposed area in the image signal in accordance with the timing signal input from the timing signal generation unit 105, and controls a gain of the image signal corresponding to the superimposed area. If a part of an image projected by another projection apparatus is superimposed on the superimposed area, the edge blend processing unit 111 controls the gain of the image signal corresponding to the superimposed area in order that the image corresponding to the superimposed area displayed on the screen is viewed as one image by a user. The edge blend processing unit 111 changes brightness of the superimposed area by controlling the gain of the image signal corresponding to the superimposed area. Hereinafter, the process performed by the edge blend processing unit 111, if a part of the image projected by another projection apparatus is superimposed on the superimposed area, in order that the image corresponding to the superimposed area displayed on the screen is viewed as one image by the user is referred to as an "edge blend process." The edge blend process is, for example, a process to control the gain of the image signal corresponding to the superimposed area so that gradation processing of the image signal corresponding to superimposed area is performed.

The light modulation device driving unit 112 converts the image signal input from the image composing unit 108 into a format suitable for the light modulation device 115 and generates pulses for driving. The light source control unit 114 controls ON/OFF and brightness of the light source 113. The superimposed area is an area in which the image projected by the projection apparatus 100 and the image projected by another projection apparatus are superimposed. The projection apparatus 100 projects an image signal including the superimposed area on an unillustrated screen. The image projected on the unillustrated screen by the projection apparatus 100 is referred to as a "projected image."

The light modulation device 115 modulates light input from the light source 113 in accordance with the image signal input from the light modulation device driving unit 112 and the driving pulse. The projection optical system 116 projects the light modulated by the light modulation device 115 on an unillustrated screen. The optical system control unit 117 controls focusing and zooming of the projection optical system 116. The ROM 119 stores, for example, a computer program executed by the control unit 103, and parameters used for the process performed by the control unit 103.

Next, an example of an operation of the projection apparatus 100 is described with reference to FIGS. 2 and 3A to 3E. FIG. 2 is a flowchart illustrating an example of a display control process performed by the projection apparatus 100 in the first embodiment. The display control process of FIG. 2 may be implemented when the control unit 103 performs the computer program stored in the ROM 119.

In S101, the control unit 103 determines whether it is requested to display the menu image via the operation unit 118. In addition, the control unit 103 may determine whether it is requested to display the menu image from an external apparatus via the communication interface 102. Then, if it is requested to display the menu image (S101: Yes), the control unit 103 forwards the process to S102. If it is not requested to display the menu image (S101: No), the control unit 103 repeats S101.

In S102, the control unit 103 reads, from the ROM 119, first position data indicating an initial display position of the menu image with respect to the projected image and forwards the process to S103.

The first position data stored in advance in the ROM 119 is described with reference to FIGS. 3A to 3E. FIGS. 3A to 3E are diagrams illustrating display positions of the menu images in the projected image 121 projected on an unillustrated screen. The numerals "1" to "9" in FIGS. 3A to 3E represent the display positions of the menu images. The display positions of the menu images correspond to any one of "1" to "9" in the projected image 121. The reference numeral 120 in FIGS. 3B to 3E denotes the superimposed area.

Figure 3A:
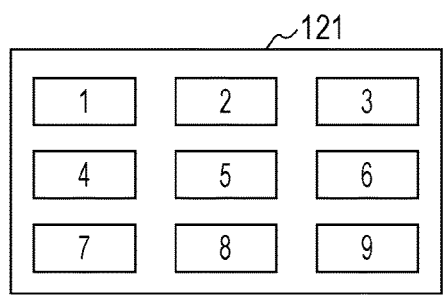
FIGS. 3A to 3E are diagrams each illustrating an example of a display position of an additional image with respect to a projected image in the first embodiment.
Figure 3B:
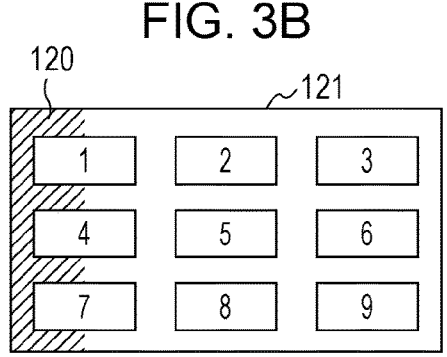
Figure 3C:
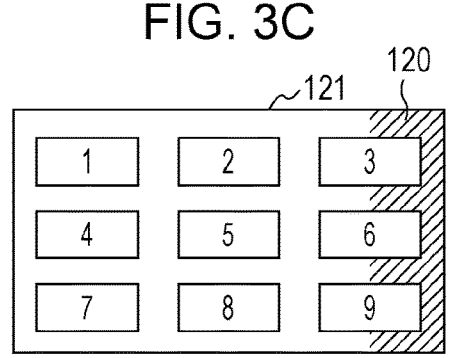
Figure 3D:
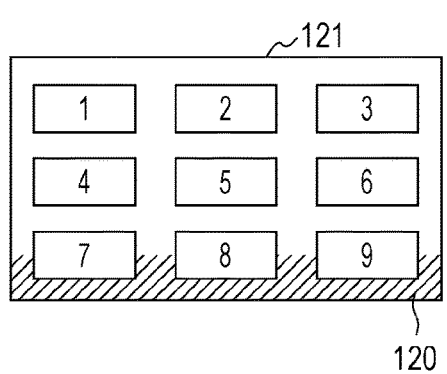

For example, FIG. 3B illustrates that a left area in the projected image 121 is the superimposed area 120. In this case, when the display position of the menu image is any one of "1," "4," and "7," the menu image is displayed in a superimposed manner on the superimposed area 120. Therefore, when the display position of the menu image is any one of "1," "4," and "7," the menu image is difficult to be seen due to the edge blend process or because the menu image is superimposed on an image projected by another projection apparatus.

Figure 3E:
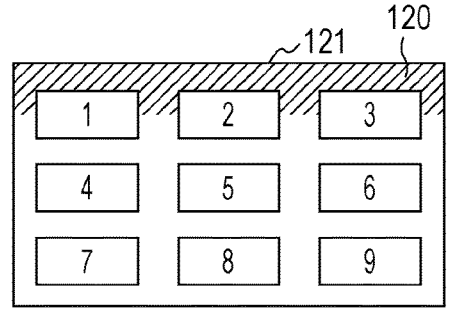

FIG. 3E illustrates that an upper area in the projected image 121 is the superimposed area 120. In this case, when the display position of the menu image is any one of "1," "2," and "3," the menu image is displayed in a superimposed manner on the superimposed area 120. Therefore, when the display position of the menu image is any one of "1," "2," and "3," the menu image is difficult to be seen due to the edge blend process or because the menu image is superimposed on an image projected by another projection apparatus. Also regarding FIGS. 3C and 3D, the same problem is caused because the display position of the menu image is superimposed on the superimposed area 120.

In the examples of FIGS. 3B to 3E, when the display position of the menu image is "5," the menu image is not superimposed on the superimposed area 120. Therefore, a situation in which the menu image is difficult to be seen due to the edge blend process or because the menu image is superimposed on an image projected by another projection apparatus can be avoided. Thus, data representing "5" is stored in advance in the ROM 119 as the first position data.

In S103, the control unit 103 causes the menu image to be displayed in accordance with the first position data read in S102 and forwards the process to S104. In particular, the control unit 103 controls the image composing unit 108 so that the menu image generated by the OSD generation unit 107 is displayed at a position corresponding to the position of "5" in the image signal output from the resolution conversion unit 106.

In S104, the control unit 103 determines whether it is requested to change the display position of the menu image via the operation unit 118. In addition, the control unit 103 may determine whether it is requested to change the display position of the menu image from an external apparatus via the communication interface 102. Then, if it is requested to change the display position of the menu image (S104: Yes), the control unit 103 forwards the process to S105. If it is not requested to change the display position of the menu image (S104: No), the control unit 103 forwards the process to S111.

In S111, the control unit 103 determines whether it is requested to complete the display of the menu image via the operation unit 118, or it is requested to complete the display of the menu image from an external apparatus via the communication interface 102. If it is requested to complete display of the menu image (S111: Yes), the control unit 103 completes this flowchart. If it is not requested to complete the display of the menu image (S111: No), the control unit 103 returns the process to S104. If it is not requested to complete the display of the menu image (S111: No), the control unit 103 controls the image composing unit 108 so that the menu image generated by the OSD generation unit 107 is no longer displayed in the image signal output from the resolution conversion unit 106. If it is not requested to complete the display of the menu image (S111: No), the control unit 103 controls the OSD generation unit 107 not to generate the menu image so that the menu image is no longer displayed in the image signal output from the resolution conversion unit 106.

In S105, the control unit 103 obtains second position data indicating a display position of the menu image changed by the user. In particular, the control unit 103 obtains the second position data from the operation unit 118 or an external apparatus via the communication interface 102, and forwards the process to S106.

In S106, the control unit 103 determines whether the edge blend processing unit 111 is performing the edge blend process for the multi-projection. If the control unit 103 determines that the edge blend processing unit 111 is performing the edge blend process (S106: Yes), the control unit 103 forwards the process to S107. If the control unit 103 determines that the edge blend processing unit 111 is not performing the edge blend process (S106: No), the control unit 103 forwards the process to S108.

In S107, the control unit 103 determines whether the display position of the menu image changed by the user is superimposed on the superimposed area 120 using the second position data obtained in S105. In particular, the control unit 103 determines at which position of FIGS. 3B to 3E the superimposed area 120 is disposed, and determines whether the position indicated by the second position data obtained in S105 is superimposed on the superimposed area 120.

For example, if the superimposed area 120 is as illustrated in FIG. 3B, the control unit 103 determines whether the display position of the menu image changed by the user is any one of "1," "4," and "7" using the second position data. In this case, if the second position data indicates any one of "1," "4," and "7," the control unit 103 determines that the display position of the menu image changed by the user is superimposed on the superimposed area 120. If the second position data indicates any one of "2," "3," "5," "6," "8," and "9," the control unit 103 determines that the display position of the menu image changed by the user is not superimposed on the superimposed area 120.

If the display position of the menu image changed by the user is not superimposed on the superimposed area 120 (S107: No), the control unit 103 forwards the process to S108. If the display position of the menu image changed by the user is superimposed on the superimposed area 120 (S107: Yes), the control unit 103 forwards the process to S109.

In S108, the control unit 103 controls the image composing unit 108 so that the menu image is displayed at a position indicated by the second position data obtained in S105. For example, if the second position data is the data indicating "2," the control unit 103 controls the image composing unit 108 so that the menu image generated by the OSD generation unit 107 is displayed at a position corresponding to "2" in the image signal output from the resolution conversion unit 106. After S108 is performed, the control unit 103 returns the process to S104.

In S109, the control unit 103 displays a notification image on the projected image on an unillustrated screen, and forwards the process to S110. The notification image is an image for notifying that the display position of the menu image changed by the user is superimposed on the superimposed area 120. The notification image may also be an image for notifying that the display position of the menu image may become difficult to be seen due to the edge blend process. Instead of the notification image, a notification sound for notifying that the display position of the menu image changed by the user is superimposed on the superimposed area 120 may be output from the projection apparatus 100.

In S110, the control unit 103 moves the display position of the menu image to a position at which the menu image is not superimposed on the superimposed area 120, and returns the process to S104. For example, in FIG. 3B, if the position indicated by the second position data is "1," the control unit 103 changes the display position of the menu image into "2," and controls the image composing unit 108 to display the menu image at the position of "2." For example, in FIG. 3B, if the position indicated by the second position data is "4," the control unit 103 changes the display position of the menu image into "5," and controls the image composing unit 108 to display the menu image at the position of "5." For example, in FIG. 3B, if the position indicated by the second position data is "7," the control unit 103 changes the display position of the menu image into "8," and controls the image composing unit 108 to display the menu image at the position of "8." After S110 is performed, the control unit 103 returns the process to S104.

If the area in which the menu image is displayed is excessively large with respect to the superimposed area 120, or if the superimposed area 120 is excessively large with respect to the area in which the menu image is displayed, there is a case in which the display position of the menu image cannot be moved to a position not to be superimposed on the superimposed area 120. In this case, in S110, the control unit 103 controls the OSD generation unit 107 to generate a reduced image in which the menu image has been reduced so that the menu image is not superimposed on the superimposed area 120, moves the display position of the reduced image to a position so as not to be superimposed on the superimposed area 120, and returns the process to S104.

The control unit 103 determines whether to perform S109 and S110 depending on the determination result of S107. However, for example, if the menu image is superimposed on the superimposed area 120 by only about 5%, visibility of the menu image projected on the screen to the user may not be reduced. Then, if the control unit 103 determines that the display position of the menu image changed by the user is superimposed on the superimposed area 120 (S107: Yes), the control unit 103 may further determine whether to perform S109 and S110 depending on a superimposition rate.

The superimposition rate is information indicating to what degree the display area of the menu image is superimposed on the superimposed area 120. In this case, the control unit 103 determines whether the superimposition rate exceeds a predetermined threshold (e.g., 10%). If the superimposition rate is below the predetermined threshold, the control unit 103 forwards the process from S107 to S108, without performing S109 and S110. If the superimposition rate exceeds the predetermined threshold, the control unit 103 forwards the process from S107 to S109. Then, in S109, the control unit 103 may further change the method for outputting the notification image and the notification sound depending on the superimposition rate.

For example, in S109, the control unit 103 may increase the size of the notification image or increase the notification sound as the superimposition rate becomes larger. Further, for example, the control unit 103 may change the content of the notification image or the notification sound in S109 depending on the superimposition rate.

As described above, in the first embodiment, when the user requires to display the menu image, whether the edge blend process is being performed is determined. If the edge blend process is being performed, whether the display position of the menu image is superimposed on the superimposed area 120 is determined. If the display position of the menu image is superimposed on the superimposed area 120, the display position of the menu image is moved out of the superimposed area, or the menu image is reduced and moved out of the superimposed area.

Thus, it is possible to prevent an additional image from being displayed in an area which is superimposed on the image projected by another projection apparatus and in which the edge blend process is performed.

OTHER EMBODIMENTS

Additional embodiments can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2014-056226, filed Mar. 19, 2014, which is hereby incorporated by reference wherein in its entirety.

What is claimed is:

1. A display apparatus comprising:
a display unit configured to display a first image on a screen, wherein the first image includes a superimposing area on which an image to be displayed on the screen by another display apparatus is superimposed and the first image is superimposed by an additional image; and
a control unit configured to perform control such that the additional image does not overlap the superimposing area by controlling change of a position on the first image where the additional image is superimposed, in a case where change of the position is requested that at least a part of the additional image is included in the superimposing area.

2. The display apparatus according to claim 1, wherein the control unit reduces a size of the additional image, in a case where change of the position is requested that at least a part of the additional image is included in the superimposing area.

3. The display apparatus according to claim 1, wherein the control unit changes the position of the additional image according to a request, in a case where the request is for change of the position such that the additional image is not included in the superimposing area.

4. The display apparatus according to claim 1, wherein the control unit controls the display unit to display warning data, in a case where change of the position is requested that at least a part of the additional image is included in the superimposing area.

5. The display apparatus according to claim 4, wherein the warning data includes data for notification that at least a part of the additional image is included in the superimposing area.

6. The display apparatus according to claim 1, wherein the control unit controls the change of the position such that the additional image does not overlap the superimposing area based on a superimposing ratio of the additional image to the superimposing area, in a case where change of the position is requested that at least a part of the additional image is included in the superimposing area.

7. The display apparatus according to claim 6, wherein the control unit changes the position of the additional image based on the request, if the superimposing ratio is equal to or less than a predetermined value.

8. The display apparatus according to claim 7, wherein the control unit controls the change of the position such that the additional image does not overlap the superimposing area, if the superimposing ratio is larger than the predetermined value.

9. The display apparatus according to claim 1, wherein the additional image includes an image to be used for adjusting an image to be displayed on the screen by the display unit.

10. The display apparatus according to claim 1, wherein the additional image includes an image to be used for controlling the display apparatus.

* * * * *